3,838,093
METHOD AND COMPOSITION FOR IMPROVING ADHESION BETWEEN ADHESIVES AND POLYESTER OR THERMOPLASTIC SUBSTRATES
William J. Owston, Edinboro, Pa., assignor to Lord Corporation, Erie, Pa.
No Drawing. Filed Oct. 25, 1972, Ser. No. 300,818
Int. Cl. C08g 51/30, 51/28
U.S. Cl. 260—33.8 UB          10 Claims

ABSTRACT OF THE DISCLOSURE

The adhesion obtained between an adhesive of the class of polymerizable liquid ethylenically unsaturated compounds containing a single terminal $>C=CH_2$ group and a solid polyester or thermoplastic substrate is improved by treating the substrate with a solution of a partial urethane adduct prior to application of the adhesive. A solution of the partial urethane adduct is also described and claimed herein.

BACKGROUND OF THE INVENTION

This invention relates to a method for improving the adhesion obtained between an adhesive of the class of polymerizable liquid ethylenically unsaturated compounds containing a single terminal $>C=CH_2$ group (referred to as the adhesive hereinafter), and a solid polyester or thermoplastic substrate and to a solution of a partial urethane adduct utilized to treat the polyester or thermoplastic substrate prior to application of the adhesive to effect the desired improvement in adhesion.

Molded or laminated polyester compositions, especially fiber reinforced polyester compositions and thermoplastic compositions (referred to as "FRP" and "plastic" compositions hereinafter), are widely utilized today to form assemblies which make up automobile body panels, truck cabs, boats and the like. The preferred method of joining molded FRP or plastics to form the desired assemblies is with a structural adhesive. It has been determined that such adhesives act to evenly distribute throughout the area of attachment stresses encountered when the assemblies are subjected to normal vibration, shocks and forces encountered when in use as part of an operating vehicle, for example. In contrast, in assemblies formed with conventional techniques such as rivets and screws, stresses encountered in use concentrate at the points of attachment, causing the holes required for the rivets and screws to crack or widen. Since the FRP or plastic is not as strong as the metal rivets or screws, holes in the FRP or plastic wear until the metal fasteners can fail by being pulled out of the seam holes.

Joining molded FRP or plastics into desired assemblies with structural adhesives is not without problems. The normally smooth surface of inert, molded FRP or plastic substrates does not foster the formation of a secure and enduring bond between the structural adhesive and the FRP or plastic substrate. Various techniques have been employed to promote adhesion between adhesives and FRP or plastic substrates.

A common practice, especially during early use of FRP and plastic assemblies, involved abrading of the bond area of the FRP or plastic substrate by grit or sandblasting to provide a surface more amenable to adhesive assembly. This technique has severe limitations and is falling into disuse. Surface abrasion by grit or sandblasting in the bond area weakens the FRP or plastic compositions in the precise areas where maximum strength is needed and renders the bond area susceptible to absorption of paint solvents which can weaken and attack the FRP or plastic. Absorbed paint solvents are especially deleterious since they can re-emerge against the structural adhesive interface causing deterioration of the adhesive bond during high temperature bake cycles used to cure the paint and primer applied to a finished assembly. Of course, abrading the bond area is costly since it involves an additional processing step and requires skilled labor to prepare the seams without destroying the cosmetic surface contour of the soon to be painted exterior automobile or truck body panels. Also, the fiberglass particles created during blasting of FRP compositions are a severe health hazard, requiring protective equipment for workers and expensive exhaust and removal equipment.

Also, the current widespread use of FRP compositions made with "low profile" polyester resins have made the use of surface abrasion techniques impossible due to unacceptable strength loss of the FRP. Low profile polyester resins are polyester resins filled or diluted with thermoplastic polymers such as polyvinyl chloride. The thermoplastic diluent prevents the polyester resin from shrinking away from the surface of the reinforcing glass fibers which are incorporated in the resin to give it strength. The reduced shrinkage gives the polyester resin a "low profile" or very smooth regular surface as contrasted to the "high" or "standard" profile of usual FRP resins which have irregularly contoured surfaces as the result of exposed reinforcing glass fibers in the resin. Low profile FRP compositions are especially desirable in forming automotive assemblies since they yield better painted surfaces with little of the previously required sanding and preparation prior to painting. However, the low profile FRP compositions are somewhat lower in strength than standard FRP compositions due to the polyvinyl chloride diluent. Thus, any strength loss due to abrasion of the low profile FRP is unacceptable.

With the recognition of the serious problems created with sandblasting, and the like, attempts have been made to develop alternative techniques for preparing FRP and plastic substrates for surface bonding with adhesives. Various treating agents or primers such as the tertiary amines described in U.S. Pat. No. 3,647,513 have been applied to FRP surfaces prior to application of certain urethane adhesives. However, it was found that the amines and solvents do not adequately soften the FRP substrates in the area of attachment and cause severe weakening of plastic substrates. Further, amines frequently inhibit curing of adhesives such as those described in this specification.

A solution of polyisocyanate in trichloroethylene has also been utilized as a surface primer in joining FRP compositions. However, FRP compositions treated with the polyisocyanate solution had to be adhesively joined within the narrow period between the time the polyisocyanate primer initially hardened, usually after about 2 days of open air moisture cure, and the time several days after application of the solution when the polyisocyanate primer coating becomes so hardened and inert that adhesive bonds cannot be formed with it.

Thus, it can be seen that the art is still searching for suitable agents for treating FRP and thermoplastic substrates to make them amenable to adhesive bonding. An ideal treating agent or primer for FRP or thermoplastic compositions should meet several criteria. The primer should eliminate any need for abrading or other surface cleaning procedures prior to application of the adhesive. Secondly, the primer must be in such a form that it can be conveniently and economically applied to the polyester or thermoplastic substrate and not require any special post application treatment such as baking, for example, to effect a bond with the polyester or thermoplastic substrate. In some instances it is necessary that the primer be ready for coating with an adhesive within a short time after its application to the polyester or thermoplastic components. Thus, in such cases, the primer should be one to which adhesives can be applied in a dried, solvent free, but uncured state. Lastly, the primer must have a sufficient pot life so that it can be prepared and utilized over a period of time sufficient to accommodate at least one work shift or preferably at least 12 hours.

It is the object of this invention to provide a method for improving the adhesion of adhesives to solid FRP or thermoplastic compositions which does not require that the surface of the FRP or thermoplastic be abraded or roughened prior to application of a structural adhesive. It is a further object of this invention to provide a composition useful to prime the surface of FRP or thermoplastic compositions to improve the adhesion obtained with the application of adhesives to the FRP or thermoplastic composition. Still another object of this invention is to produce a solution of a partial urethane adduct useful as a primer for solid FRP or thermoplastic compositions which satisfies the general criteria noted above.

DETAILED DESCRIPTION OF THE INVENTION

This invention relates to a method for improving the adhesion between an adhesive of the class of polymerizable liquid ethylenically unsaturated compounds containing a single terminal $>C=CH_2$ group and solid polyester or thermoplastic substrates comprising treating the solid polyester or thermoplastic substrate with a solution of a partial urethane adduct, applying the adhesive to the treated polyester or thermoplastic substrate and allowing the adhesive to cure. The solid polyester or thermoplastic composition is treated with a solution of from about 0.85 to about 40 parts, by weight, of a partial urethane adduct in from about 60 to about 100 parts of a low boiling, inert organic solvent said partial urethane adduct being the reaction product of from about 0.1 to 0.7 molar equivalent weight of a hydroxy functional monomer and 1 molar equivalent weight of polyisocyanate. The solution thus prepared will be referred to herein as a treating agent or primer.

The solid polyester and thermoplastic compositions utilized in forming the desired bonded or laminated structures are all well known, commercially available materials. For example, polyester materials are those which may be made by reacting suitable polycarboxylic acids or their anhydrides with suitable glycols such as ethylene, propylene or butylene glycol. Glass fiber reinforced polyester (FRP) compositions, especially low profile FRP, are especially preferred materials utilized in forming assemblies which can be finished with a high gloss surface and utilized, for example, in automobile bodies.

Thermoplastic compositions, which can also be utilized in forming high strength components useful in automative and like applications, include acrylonitrile-butadiene-styrene (ABS), plastics formed by dispersing butadiene in an acrylonitrile-styrene copolymer or other copolymers of acrylonitrile; styrene-acrylonitrile (SAN), plastics; polymers or copolymers of acrylic or methacrylic esters; polyvinyl chloride (PVC), a thermoplastic formed by heating vinyl chloride under pressure with azodiisobutyronitrile; PVC-acrylic blends, thermoplastics formed by copolymerizing vinyl chloride with acrylic monomers derived from acrylic acid; and polyphenylene oxide, a thermoplastic material formed by the copper-catalyzed oxidation of 2,6-xylenol and available commercially as PPO® from General Electric Company.

The treating agent or primer applied to solid polyester or thermoplastic compositions to improve adhesion between adhesives and the solid substrates can generally be defined as a solution of a partial urethane adduct. As will be described in greater detail, the primer may contain other components to provide especially desired characteristics.

The partial urethane adduct is formed by combining a polyisocyanate of tri or higher functionality with an amount of a hydroxy functional monomer such as the hydroxy alkyl acrylates or methacrylates including hydroxyethyl methacrylate, (HEMA), hydroxypropyl methacrylate or other hydroxylated vinyl functional monomers such that the OH:NCO ratio is 0.1 to 0.7 and heating the mixture to above room temperature up to about 130° C. Mixtures having an OH:NCO ratio within this range may be obtained by combining from about 0.1 to about 0.7, preferably 0.2 to 0.6 molar equivalent weight of a hydroxy functional monomer with about 1 molar equivalent weight of polyisocyanate. This reaction will generally take place in a non-reactive, compatible solvent such as styrene, methylmethacrylate, trichloroethylene, toluene or the like under a dry atmosphere and is continued until about 50% of the reactive NCO groups of the polyisocyanate are converted to a urethane linkage through reaction with the functional hydroxy moieties of the monomer. The resultant partial urethane adduct thus contains some free NCO moieties. Polyisocyanates of tri or higher functionality include the phosgenated mixture, polymethylene polyphenylisocyanate, obtained by phosgenation of the rearrangement product of the reaction of aniline and formaldehyde described in U.S. Pat. 2,683,730. Polyisocyanates of this class are known to contain small quantities of a diisocyanate to improve the overall balance of physical properties thereof.

A solution of the partial urethane adduct just described may be utilized alone as an adhesion promoting primer for solid polyester or thermoplastic compositions; however, it has also been found that solutions containing a mixture of this adduct and a partial urethane adduct formed by combining a polyisocyanate with hydroxylated butadiene polymers or copolymers may be especially useful for applications where flexibility and lack of brittleness in the primer film are desirable.

Partial urethane adducts formed by the reaction of a polyisocyanate and a hydroxylated butadiene polymer or copolymer may be prepared by combining a polyisocyanate such as those described above with an amount of a hydroxylated butadiene polymer or copolymer such that the OH:NCO ratio is 0.05:0.35 and heating the mixture to above room temperature up to about 130° C. Mixtures having an OH:NCO ratio within this range may be obtained by combining from about 0.05 to about 0.35 molar equivalent weight of a hydroxylated butadiene polymer or copolymer with about 1 molar equivalent weight of polyisocyanate. This reaction will generally take place in a non-reactive compatible medium and is continued until about 15% of the reactive NCO groups of the polyisocyanate are converted to a urethane linkage through reaction with the functional hydroxy moieties of the moieties of the butadiene polymer or copolymer. The resultant partial urethane adduct thus contains some free NCO moieties. Useful hydroxylated butadiene polymers or copolymers include hydroxylated butadiene homopolymers having a molecular weight ranging from about 400 to 20,000, preferably about 3000 to 4000; hydroxylated butadiene/styrene copolymers containing about 75% butadiene monomer and 25% styrene monomer, said percent being by weight, based on the weight of the copolymer, and having a molecular weight of about 400 to 20,000, preferably about 3000; and hydroxylated acrylonitrile/butadiene copolymers containing about 15% acrylonitrile monomer and 85% butadiene monomer, said percentage being by weight, based on the weight of the copolymer, and having a molecular weight of from about 400 to 20,000, preferably 4000 to 4500.

When the primer solution is to contain a mixture of the polyisocyanate-HEMA partial urethane adduct and the polyisocyanate-hydroxylated butadiene polymer or copolymer partial urethane adduct, the adducts may be combined in any proportion ranging from about 1:0.2 to 0.2:1. It should be noted, however, that while a solution of the polyisocyanate-HEMA partial urethane adduct alone may be utilized as satisfactory primers for solid polyester or thermoplastic compositions, the polyisocyanate hydroxylated butadiene polymer or copolymer partial urethane adduct cannot.

The primer solutions are formed by dissolving or dispersing the partial urethane adduct or mixture of partial urethane adducts in an inert, low boiling, organic solvent such as methylene chloride, styrene, vinyl toluene, toluene, cellosolve acetate, trichloroethylene, methyl isobutyl ketone, xylene and the like. A single solvent such as methylene chloride, an especially preferred solvent, or a mixture of methylene chloride with any one or more of the solvents listed above may be utilized as the primer solvent. Useful primer solutions are formed with the addition of from about 0.85 to about 40, preferably from about 2 to about 15 parts, by weight of a partial urethane adduct or mixture of partial urethane adducts in from about 60 to about 100, preferably from about 85 to 98 parts of the low boiling, inert organic solvent. When it is desired to have a sprayable primer solution, higher boiling solvents, such as styrene, vinyl toluene, methyl isobutyl ketone, xylene, butyl acetate, or mixtures thereof in any proportion may be utilized. A 12% solids solution of the partial urethane adduct or adducts in higher boiling solvents forms a useful sprayable primer solution.

The treating agent may be applied to thin films, built up sheets or molded solid polyester or thermoplastic compositions. Preferably, the treating agent is dispersed or dissolved in a solvent and the solution is applied to the surface of the solid polyester or thermoplastic substrate by brushing, spraying, rolling or other suitable techniques. After application, the solvent is allowed to evaporate leaving the treating agent deposited on the surface of the solid polyester or thermoplastic composition. In this manner, the treating agent is deposited on the solid polyester or thermoplastic composition in the form of a low molecular weight film which wets and conforms physically to the substrate. After evaporation of the solvent, the treating agent should be cured prior to application of the adhesive. Otherwise, with application of the adhesive overcoat, the treating agent tends to solvate and separate from the primed substrate. The treating agent deposited on the solid polyester or thermoplastic substrate may be cured on exposure to ambient moisture over a period of about 16 to 72 hours. This moisture cure mechanism provides a means of building a high polymer like surface on the primer components at room temperature in a relatively brief time without resort to complicated processing. Curing may be accelerated by baking the treated substrate in an oven at temperatures ranging from 200° to 280° F. for about 10 minutes; however, this increases processing costs. The polyester or thermoplastic substrate whose surface has been so treated and cured may then be coated or covered with an adhesive and with the joinder of two such surfaces and curing of the adhesive a strong, flexible bond or laminate is achieved. preferably, the adhesive will be applied to each of the surfaces being joined and each surface will have been primed in the manner described above prior to application of the adhesive.

Adhesives which can be utilized in the process of this invention include those of the class of polymerizable liquid ethylenically unsaturated compounds containing a single terminal $>C=CH_2$ group. Useful adhesives of this class include those defined in U.S. Pat. No. 3,321,351 wherein a prepolymer is formed by mixing polymerizable liquid monomeric compounds containing a terminal $>C=CH_2$ group such as styrene, vinyl toluene, acrylic acid, methacrylic acid, lower alkyl esters of acrylic or methacrylic acid or mixtures of such monomers with polymerizates thereof with a suitable catalyst and small quantities of waxy materials. Other adhesives of this class include modified acrylic adhesives such as those described in U.S. Pat. No. 3,333,025 wherein a prepolymer is formed by mixing methyl methacrylate, monostyrene and polychloroprene with a suitable catalyst until a mixture having a viscosity of about 62,000 cps. is obtained. This prepolymer is then combined with other resinous material and catalyzed with 3%, by weight, of a 55% mixture of benzoyl peroxide in butyl benzyl phthalate to form the desired adhesive. Polyester, especially glass reinforced polyester components previously conditioned with the treating agent described above and overcoated with an adhesive of this type may be joined and held together forming a tough, extremely resistant laminate.

Polymerizable liquid ethylenically unsaturated compounds containing a terminal vinyl group useful as adhesives for thermoplastic substrates, especially in the formation of reinforced thermoplastic objects or shapes, made with plastics such as ABS, PVC and PVC acrylic blends may be prepared, for example, by forming a mixture of a polyester resin and styrene, or like crosslinking monomer. Polyester resins used in forming such adhesives include the condensation products of short chain polyols including polyalkylene glycols such as polyethylene glycols, polypropylene glycols and polyethylenepropylene glycols with maleic anhydride and phthalic anhydride. Fillers or additives such as glass fibers, talc or antimony oxide are frequently incorporated in such adhesives producing compositions which when coated on a thermoplastic substrate and cured, serve to reinforce the substrate. Those adhesives containing antimony oxide and like materials impart fire-retardant properties to the thermoplastic substrate. Curing of such adhesives may be catalyzed by incorporating a redox catalyst such as cobalt naphthenate and methylethyl ketone hydroperoxide in the adhesive prior to its application to a thermoplastic composition.

It was mentioned earlier that the adhesives should not be applied to solid polyester and thermoplastic compositions which have been treated with the primer solutions described above prior to curing of the primer film. Since curing requires 16 or more hours with exposure to room temperature and ambient moisture delays and storage between priming and fabricating are required. The usefulness of the primer is thus somewhat limited due to the demands of high speed mass production techniques and the alternative of high temperature curing is undesirable because of the costs in terms of energy required and additional processing equipment. Further, the cure time of the primer cannot be shortened significantly with catalysts as the pot life of the treating agent would become too brief for reasonable use.

This problem has been solved with the incorporation of a long chain, hydroxylated polyester in the treating agent together with the partial urethane adduct or adducts. Hydroxylated polyesters useful for this purpose are generally composed of a mixture of short chain polyols, preferably ethylene glycol or glycerol and an organic acid or anhydride, preferably terephthalic acid. The hydroxylated polyesters have pendant or terminal reactive OH groups and are characterized by their solubility in halogenated-organic solvents like methylene chloride and insolubility in other common solvents such as ketones, esters, aromatics and the like. They are partially soluble in trichloroethylene. A commercially available hydroxylated polyester of this type is USM Polymer 7804 available from USM Chemical Company.

Primer solutions such as those described above containing from about 0.3 to about 10%, by weight, based on the weight of the solution, of a hydroxylated polyester may be applied to solid polyester or thermoplastic compositions in those instances where the time required for curing of the primer will be especially burdensome. The solubility characteristics of the hydroxylated polyester require that methylene chloride, or like materials, be utilized as the solvent for such primer solutions. After application of the polyester containing primer, the solvent need only be evaporated and then the adhesive may be applied directly to the primed composition. In this manner, the treated composition can be overcoated with an adhesive shortly after application, and well prior to complete curing of the primer. Curing of the primer film occurs simultaneously with curing of adhesive and the strength and flexibility of the resulting bond is not adversely affected. It is theorized that the solubility characteristics of the hydroxylated polyester contained in the primer solution permits the adhesives to wet the dried primer films but resists any actual penetration of the adhesive into the uncured primer film thereby preventing solvation or softening of primer film before it is cured.

This invention will be more fully illustrated by the following examples.

Example 1

131 g. (1 equivalent weight) of polyisocyanate A and 13 g. (0.1 equivalent weight) of 2-hydroxyethyl methacrylate (HEMA), where polyisocyanate A is the phosgenated mixture obtained by phosgenation of the rearrangement product of the reaction of aniline and formaldehyde as described in U.S. Pat. No. 2,683,730 together with 51 g. of anhydrous trichloro-ethylene solvent were added to a nitrogen purged reaction vessel equipped with a reflux condenser. The mixture was heated for 2 hours at 180° F. while being stirred. After cooling to room temperature, a clear partial urethane solution was obtained ready for use. Like mixtures were prepared in the same manner utilizing 0.2, 0.3, 0.5, 0.6 and 0.7 equivalent weights of HEMA respectively.

15% solids solutions of these partial urethane adducts in trichloroethylene along with a like solution of unmodified polyisocyanate A, were applied to clean FRP sections cut from 0.125 mil sheet stock. The primer films were cured for 24 hours at 72° F. and 55% relative humidity and post baked at 280° F. for 30 minutes. The baked sections were cooled to room temperature and cut into 1" x 4" coupons.

The coupons were subjected to an impact force of 30 inch-lbs. using a Gardner Impact Tester. Coupons treated with a solution of polyisocyanate A alone were fractured of the urethane adducts of Example 1. The primed coupons were dried for 15 minutes at ambient, room temperature conditions and cured at room temperature, exposed to ambient moisture (curing Method A), or cured by baking in an air convection oven at 280° F. for 10 minutes (curing Method B). Coupons cured in each manner were bonded together at varying times after being cured with the modified acrylic adhesive described in Example 7 of U.S. Pat. No. 3,333,025 catalyzed with 3%, by weight, of a mixture of 55% benzoyl peroxide in butyl benzyl phthalate forming one inch square single overlap bond joints. The adhesive was allowed to cure at 75° F. for 24 hours and the bonded assemblies were destructively tested by shearing with a tensile tester using a crosshead speed of 1" per minute.

Table I contains the results of these tests and illustrates the quality of the adhesive bond formed between FRP coupons treated with the various primer solutions described therein. Ideally, the adhesive bond should have a strength equal to or in excess of that of the polyester or thermoplastic composition it is bonding together. For this reason the destructive tests carried out on the samples in Table I were expected to cause failure within the FRP composition itself rather than in the bonded joint. Failures occurring between the FRP compositions and the structural adhesive indicate that the adhesive has failed; such failures are unacceptable and are abbreviated as "AF" in Table I. Acceptable failures, those indicating integrity, or greater strength in the adhesive bond than in the FRP composition are called fiber tearing or partial fiber tearing failures, abbreviated as "FT" or "PFT" respectively. Thus in Table I, fiber tearing failure (FT), is the standard of acceptability against which the usefulness of the bonding methods must be compared. The bonding and testing procedure outlined above will be referred to as "Procedure A" hereinafter.

TABLE I.—FAILURE OCCURRENCE ON DESTRUCTIVE TESTING

| Sample number | Urethane adduct solution | | | | | | | | | | |
|---|---|---|---|---|---|---|---|---|---|---|---|
| | Polyisocyanate A [1] | HEMA [1] | | | | | | | | | |
| 1 | 1 | 0.7 | PFT | AF | PFT | PFT | PFT-AF | PFT | AF | PFT-PF | PF |
| 2 | 1 | 0.6 | PFT | PFT | PFT | FT | FT | FT | PFT | PFT | PF |
| 3 | 1 | 0.5 | FT | FT | FT | FT | FT | FT | FT | FT | PF |
| 4 | 1 | 0.3 | FT | FT | FT | FT | FT | FT | FT | FT | PF |
| 5 | 1 | 0.2 | FT | FT | FT | FT | FT | FT | FT | FT | PF |
| 6 | 1 | 0.1 | PFT | PFT | FT | PFT | PFT | PFT | PFT-AF | PFT | PF |
| 7 | 1 | | PFT | PFT | FT | PFT | PFT | AF | AF | AF | PF |
| Curing method: A=room temperature cure; B=Bake | | | B | B | B | B | B | B | B | B | A |
| Layover between cure and adhesive application, (days) | | | (2) | 1 | 5 | 10 | 15 | 20 | 30 | 40 | (2) |

[1] Molar equivalent weight of ingredients dissolved in trichloroethylene at 12% solids.
[2] 1 hour.

NOTE.—The results in Table I are explained with the following legend: AF=Adhesive bond failure; PFT=Partial fiber tearing failure; FT=Fiber tearing failure within the FRP composition; PF=Primer to composition failure.

by the impact, the cracked film being flaked off by scraping with a knife edge. Coupons treated with the solution containing 1 equivalent weight polyisocyanate A and 0.1 equivalent weight HEMA fractured on impact, but resisted flaking with a knife edge. Multiple impacts of the Gardner mandrel fractured this film so that it would flake. Treating coupons with the other adducts containing greater amounts of HEMA resulted in the formation of films which were only slightly cracked after multiple impacts with the Gardner mandrel and resisted all attempts to lift or be removed with the knife edge.

Example 2

1" x 4" test coupons cut from ⅛" FRP test stock were dipped into 12% solids solutions in trichloroethylene Table I illustrates that a primer solution containing polyisocyanate A alone loses its effectiveness with aging. Resistance to tearing is increased when HEMA is combined with the polyisocyanate forming a partial urethane primer, especially in samples 2 through 5. All samples cured at room temperature prior to adhesive application exhibited failure in the primer itself.

Example 3

Following the procedure of Example 1, a series of urethane adduct primer solutions were prepared by mixing polyisocyanate A and a hydroxylated butadiene-styrene copolymer having a molecular weight of about 3000 in the proportions set forth in Table II. These solutions were applied to FRP sheets and cut into 1" x 4" coupons which were bonded and tested in accordance with Procedure A. The results are set forth in Table II.

This table illustrates that primer solutions containing from about 0.85 to about 30% solids in methylene chlo-

TABLE II.—FAILURE OCCURRENCE ON DESTRUCTIVE TESTING

| Sample number | Urethane adduct solution [1] | | | | | | | | |
|---|---|---|---|---|---|---|---|---|---|
| | Polyisocyanate A | Butadiene styrene copolymer [2] | | | | | | | |
| 1 | 1 | 0.05 | FT | FT | PFT-AF | PFT | PFT | AF | AF |
| 2 | 1 | 0.08 | PFT | FT | FT | PFT | AF | PFT-AF | PFT-AF |
| 3 | 1 | 0.1 | FT | FT | PFT | PFT | AF | AF | AF |
| 4 | 1 | 0.14 | FT | FT | FT | PFT-AF | AF | AF | AF |
| 5 | 1 | 0.2 | FT | FT | PFT | PFT-AF | AF | AF | FT |
| 6 | 1 | 0.25 | PFT | PFT | PFT | AF | PFT-AF | AF | AF |
| 7 | 1 | 0.35 | PFT | PFT | PFT | AF | PFT | AF | AF |
| Cure method: Layover between cure and adhesive application (days) | | | 1 | 5 | 10 | 15 | 20 | 30 | 40 |

[1] Expressed as molar equivalent weight of components dissolved in methylene chloride at 12% solids.
[2] ARCO ® CS-15 of ARCO Chemical Co.

Example 4

Following the procedure of Example 1, a series of urethane adduct primer solutions containing varying amounts of a mixture of a polyisocyanate A–HEMA adduct and a polyisocyanatebutadiene styrene copolymer adduct were applied to FRP substrates and evaluated in accordance with Procedure A. The results are set forth in Table III.

ride are effective as adhesion promoters.

Example 6

This example illustrates that mixtures of polyisocyanate A with either 2-hydroxyethyl methacrylate or 2-hydroxypropyl methacrylate form partial urethane adducts which are equally effective as adhesion primers. A series of 12%

TABLE III

| Sample number | 1 | 2 | 3 | 4 | 5 | 6 | 7 |
|---|---|---|---|---|---|---|---|
| | Parts, by weight, based on weight of primer in 12%, solids solution in methylene chloride | | | | | | |
| Urethane adduct primer solution: | | | | | | | |
| Polyisocyanate A/HEMA adduct (Table I, sample 4) | 1 | 1 | 0.8 | 0.6 | 0.4 | 0.2 | 0.1 |
| Polyisocyanate A/butadiene styrene copolymer adduct (Table II, sample 5) | 0 | 0.2 | 0.4 | 0.6 | 0.8 | 1 | 1 |
| Type of failure,[1] bond test-procedure A (bonding after 30 day layover period) | PFT | PFT | FT | FT | FT | PFT | AF |
| Bond strength, p.s.i. | 660 | 650 | 720 | 730 | 715 | 660 | 450 |
| Impact test [2] | F, 20% PFT | FC | FC | FC | FC | NF | NF |
| Peel test [3] | 80% NFL | NFL | NFL | NFL | NFL | | |

[1] Failure legend of Table I.
[2] Primer cast on FRP sheet, dried, cured and struck 5 times with mandrel of Gardner Impact Tester at level of 40 ft./lbs.
[3] Cracked film resulting from impact test tested with knife edge for peelability.

NOTE.—Legend for peel test of Table III: F=Fracture; NF=No fracture; FC=Fine cracking; FL=Film lift, adhesion loss; NFL=No film lift, no adhesion loss; PFL=Partial film lift.

Table III illustrates that the effective range of combinations of the adducts of Example 4 is between about 1:0.2 and 0.2:1. Table III also shows that if the polyisocyanate A-butadiene/styrene copolymer adduct content of the primer is reduced to zero or near zero (Samples 1 and 2), the polyisocyanate A-HEMA adduct is operable alone as a primer, albeit with reduced impact strengths. Likewise, if the polyisocyanate A-HEMA adduct content of the primer is reduced to near zero (Sample 7), the impact strength is great; however, the bond strength is greatly reduced.

Example 5

A series of primer solutions containing a combination of a polyisocyanate A-HEMA urethane adduct and a polyisocyanate A-butadiene/styrene copolymer urethane adduct in methylene chloride were evaluated on FRP compositions. The results are shown in Table IV.

solids solutions in methylene chloride of urethane adducts containing varying amounts of the hydroxy functional monomers were prepared and evaluated for bond strength as illustrated in Table V.

TABLE V

| Sample number | 1 | 2 | 3 | 4 | 5 |
|---|---|---|---|---|---|
| Urethane adduct primer solution: | | | | | |
| Polyisocyanate A | 1 | 1 | 1 | 1 | 1 |
| 2-hydroxyethyl methacrylate | 0.2 | 0.6 | | | |
| 2-hydroxypropyl methacrylate | | | 0.2 | 0.3 | 0.6 |
| Bond strength measured by procedure A after 2 day layover [1] | FT | FT | FT | FT | FT |

[1] Legend of Table I.

No performance difference is noted between the two hydroxy functional monomers in the primer formulas of Table V.

TABLE IV

| Sample number | 1 | 2 | 3 | 4 | 5 | 6 | 7 | 8 |
|---|---|---|---|---|---|---|---|---|
| | Concentration of the combined adducts by weight solids in the primer solution | | | | | | | |
| Urethane adduct primer solution: | | | | | | | | |
| Polyisocyanate A/HEMA adduct (Table 1, sample 4) | 0.5 | 1 | 3 | 6 | 9 | 12 | 18 | 24 |
| Polyisocyanate A/butadiene-styrene adduct (Table II, sample 5) | 0.35 | 0.7 | 2 | 4 | 6 | 8 | 12 | 16 |
| Methylene chloride | 99.15 | 98.3 | 95 | 90 | 85 | 80 | 70 | 60 |
| Bond strength measured by procedure A after layover time of:[1] | | | | | | | | |
| 1 day | AF | AF | FT | FT | FT | PFT | AF | AF |
| 10 days | PFT | FT | FT | FT | FT | FT | FT | PF |
| 30 days | PFT-AF | FT | FT | FT | FT | FT | FT | PF |

[1] Legend of Table I.

Example 7

A series of primer solutions were prepared containing like quantities, expressed in molar equivalent weight, of mixed polyisocyanate A-HEMA urethane adduct and polyisocyanate A-butadiene-styrene copolymer urethane adduct with varying quantities of a hydroxyl terminated polyester in methylene chloride. The primer solutions were applied to FRP compositions and tested for bond strength in the manner of Procedure A with the exception that the primer coated coupons were dried at room temperature for 15 minutes prior to being overcoated with adhesive. For comparison, one solution was prepared utilizing toluene as the solvent and another was prepared with a methylene chloride-styrene mixture as the solvent. The results are set forth in Table VI.

plication of the primer. After application of the primer the coupons were dried followed by the application of an adhesive formed by mixing 45% of an unsaturated polyester in monostyrene followed by the addition of a redox catalyst comprising 1% cobalt naphthenate and 1% methylethyl ketone hydroperoxide and 30% of chopped glass fibers, said percentages being by weight, based on the weight of the adhesive. The adhesive coated coupons were allowed to cure and tested for bond strength 5 days after lamination. Bond strength was determined in a cleavage test in which one end of the laminate is anchored in a vertical position with a steel wedge being driven between the laminate of glass fiber reinforced polyester and the thermoplastic substrate. The results of this test are set forth in Table VII.

TABLE VI.—EFFECT OF HYDROXYL TERMINATED POLYESTER CONTENT ON PRIMER SOLUTION

| Sample number | 1 | 2 | 3 | 4 | 5 | 6 | 7 | 8 | 9 | 10 |
|---|---|---|---|---|---|---|---|---|---|---|
| Urethane adduct primer solution: | | | | | | | | | | |
| Polyisocyanate A/HEMA adduct (Table 1, sample 4) | 7 | 7 | 7 | 7 | 7 | 7 | 7 | 7 | 7 | 7 |
| Polyisocyanate A/butadiene-styrene copolymer (Table II, sample 5) | 5 | 5 | 5 | 5 | 5 | 5 | 5 | 5 | 5 | 5 |
| Hydroxyl terminated polyester (USM No. 7804 USM Chemical Corp.) | 0 | 0.2 | 0.5 | 1 | 2 | 4 | 8 | 10 | 2 | 2 |
| Methylene chloride | 88 | 87.8 | 87.5 | 87 | 86 | 84 | 80 | 78 | 71 | |
| Toluene | | | | | | | | | | 86 |
| Styrene | | | | | | | | | 15 | |
| Solution viscosity (cps.) | 40 | 40 | 45 | 47 | 60 | 77 | 105 | 140 | 100 | (2) |
| Bond strength measured by procedure A [1] | PF | PF | PFT | FT | FT | FT | PFT | AF | PFT | |

[1] Legend of Table I. [2] No solution.

with varying quantities of a hydroxyl terminated polyester in methylene chloride. The primer solutions were applied to FRP compositions and tested for bond strength in the manner of Procedure A with the exception that the primer coated coupons were dried at room temperature for 15 minutes prior to being overcoated with adhesive. For comparison, one solution was prepared utilizing toluene as the solvent and another was prepared with a methylene chloride-styrene mixture as the solvent. The results are set forth in Table VI.

TABLE VII

| Thermoplastic substrate | Polyvinyl chloride [1] | | ABS [2] | | Acrylic [3] | | PVC/acrylic alloy [4] | |
|---|---|---|---|---|---|---|---|---|
| Urethane adduct primer solution: | | | | | | | | |
| Sample No. 1, Table VI | FT | FT | FT | FT | FT | FT | FT | FT |
| Sample No. 5, Table VI | PF | FT | PF | FT | PF | FT | PF | FT |
| No primer | PPF | PPF | PPF | PPF | PPF | PPF | PPF | PPF |
| Hours layover prior to adhesive application | 0.5 | 24 | .5 | 24 | .5 | 24 | .5 | 24 |

[1] Unplasticized PVC of medium molecular weight.
[2] Acrylonitrile-butadiene-styrene terpolymer of Marbon Division of Borg Warner Corporation.
[3] Plexiglas VM® of Rohm and Haas Corporation.
[4] Kydex 100® of Rohm and Haas Corporation.

NOTE.—Legend of Table VII: FT=Fiberglass reinforced resin failure; PF=Primer failure; PPF=Polyester to thermoplastic failure.

This table illustrates that primer solutions containing a hydroxyl terminated polyester soluble in methylene chloride may be applied to FRP compositions followed almost immediately by the application of adhesive and yet form bonds with excellent strength characteristics.

Example 8

The example illustrates the application of the primer solutions of this invention to thermoplastic compositions. The primer solutions, identified in Table VII, were prepared and applied to 4" x 4" test coupons cut from ⅛" thick stock sheets of the various thermoplastic compositions. The coupons were not surface cleaned before application of the primer. After application of the primer the coupons were dried followed by the application of an adhesive formed by mixing 45% of an unsaturated polyester in monostyrene followed by the addition of a redox catalyst comprising 1% cobalt naphthenate and 1%

This table illustrates that the primer solutions of this invention are effective in improving the adhesion of the adhesives to thermoplastic compositions.

Example 9

A series of primer solutions were prepared with partial urethane adducts each having like amounts of polyisocyanate A and varying amounts of several different hydroxylated butadiene polymers or copolymers. Samples 1 through 4 also contain 7.2 parts of the polyisocyanate A-HEMA urethane adduct of sample 4, Table I. The solutions were prepared as 12% solids solutions in methylene chloride and applied to FRP coupons and tested for bond failure in accordance with Procedure A. The results are set forth in Table VIII.

equivalent weight of a polyisocyanate of tri or higher functionality and a partial urethane adduct being the re-

TABLE VIII

| Sample number | Molar equivalent weight | | | | | | | |
|---|---|---|---|---|---|---|---|---|
| | 1 | 2 | 3 | 4 | 5 | 6 | 7 | 8 |
| Primer solution: | | | | | | | | |
| Polyisocyanate A | 1.0 | 1.0 | 1.0 | 1.0 | 1.0 | 1.0 | 1.0 | 1.0 |
| Hydroxylated polybutadiene homopolymer, 3,000 average molecular wt.[1] | 0.2 | | | | 0.2 | | | |
| Hydroxylated butadiene/styrene copolymer 75/25 wt. percents, molecular weight of 3,000 [2] | | 0.2 | | | | 0.2 | | |
| Hydroxylated acrylonitrile/butadiene copolymer, 15/85 wt. percents, molecular wt. average of 4,300 [3] | | | 0.2 | | | | 0.2 | |
| Hydroxylated pol butadiene homopolymer, 3,800 average molecular wt.[4] | | | | 0.2 | | | | 0.2 |
| Bond strength as measured following bond procedure A, layover of 3 days before bonding | FT | FT | FT | FT | PFT | PFT | PFT | PFT |
| Bond strength (p.s.i.) | 750 | 775 | 780 | 720 | 510 | 350 | 380 | 440 |
| Primer layover of 30 days | FT | FT | FT | FT | PFT-AF | AF | AF | PFT-AF |
| Bond strength (p.s.i.) | 830 | 910 | 740 | 770 | 260 | 180 | 160 | 300 |

[1] Polybutadiene homopolymer ARCO® R45M of ARCO Chemical Co.
[2] ARCO CS-15 of ARCO Chemical Co.
[3] ARCO CN-15 of ARCO Chemical Co.
[4] ARCO R-15 M of ARCO Chemical Co.

Having thus described this invention, what is claimed is:

1. A primer for improving the adhesion between an adhesive of the class of polymerizable liquid ethylenically unsaturated compounds containing a single terminal $>C=CH_2$ group and a substrate selected from the group consisting of solid polyester and solid thermoplastic compositions consisting essentially of a solution of from about 0.85 to about 40 parts, by weight, of a partial urethane adduct in 60 to 100 parts of a low boiling, inert organic solvent, said partial urethane adduct being the reaction product of from about 0.1 to about 0.7 molar equivalent weight of a hydroxy functional monomer and 1 molar equivalent weight of polymethylene polyphenylisocyanate of tri or higher functionality.

2. The primer of claim 1 wherein said solution also contains from about 0.3 to about 10%, by weight, based on the weight of the solution of a terephthalate polyester formed from the reaction of an organic polyol and terephthalic acid or terephthalic anhydride.

3. The primer of claim 2 wherein said terephthalate polyester is formed from the reaction of short chain polyols and terephthalic acid or terephthalic anhydride and is soluble in methylene chloride.

4. The primer of claim 1 wherein said hydroxy functional monomer is a member selected from the group consisting of hydroxyethyl methacrylate and hydroxypropyl methacrylate.

5. The primer of claim 1 wherein said low boiling, inert organic solvent is a member selected from the group consisting of methylene chloride, styrene, vinyl toluene, toluene, Cellosolve acetate, trichloroethylene, methylisobutyl ketone, xylene and mixtures of two or more of said solvents in any proportion.

6. The primer of claim 1 wherein said solution is a 12% solids solution in methylene chloride.

7. A primer for improving the adhesion between an adhesive of the class of polymerizable liquid ethylenically unsaturated compounds containing a single terminal $>C=CH_2$ group and a substrate selected from the group consisting of solid polyester and solid thermoplastic compositions consisting essentially of a solution of from about 0.85 to about 40 parts, by weight, of a partial urethane adduct in 60 to 100 parts of a low boiling, inert organic solvent, said partial urethane adduct being the reaction product of from about 0.1 to about 0.7 molar equivalent weight of a hydroxy functional monomer and 1 molar action product of from about 0.05 to about 0.35 molar equivalent weight of a hydroxylated butadiene polymer or copolymer and 1 molar equivalent weight of a polyisocyanate of tri or higher functionality said partial urethane adducts being combined in said solution in a proportion ranging from 1:0.2 to 0.2:1.

8. The primer of claim 7, wherein said solution also contains from about 0.3 to about 10%, by weight, based on the weight of the solution of a terephthalate polyester formed from the reaction of an organic polyol and terephthalic acid or terephthalic anhydride.

9. The primer of claim 8 wherein said terephthalate polyester is formed from the reaction of short chain polyols and terephthalic acid or terephthalic anhydride and is soluble in methylene chloride.

10. The primer of claim 7 wherein said hydroxylated butadiene polymer or copolymer is a member selected from the group consisting of hydroxylated butadiene homopolymers having a molecular weight ranging from about 400 to 20,000; hydroxylated butadiene-styrene copolymers containing about 75%, by weight, butadiene monomer and 25%, by weight, styrene monomer and having a molecular weight of about 400 to about 20,000; and hydroxylated acrylonitrile-butadiene copolymers containing about 15%, by weight, acrylonitrile monomer and 85%, by weight, butadiene monomer and having a molecular weight of about 400 to 20,000.

References Cited

UNITED STATES PATENTS

| 3,425,988 | 2/1969 | Gorman | 260—77.5 CR |
| 2,958,704 | 11/1960 | Dinbergs | 260—471 C |
| 3,297,745 | 1/1967 | Fekete | 260—471 C |
| 3,642,943 | 2/1972 | Noel | 260—859 R |
| 3,455,857 | 7/1969 | Holzrichter | 260—22 |
| 3,509,234 | 4/1970 | Burlant | 260—859 |

ALLAN LIEBERMAN, Primary Examiner

P. R. MICHL, Assistant Examiner

U.S. Cl. X.R.

117—76 A, 76 F; 260—31.2 N, 31.4 R, 32.8 N, 33.6 UB, 77.5 CR, AP, 471 C, 482 B